O. HUSSEY.

Harvester Cutter.

No. 451. Reissued April 14, 1857.

N. PETERS. Photo-Lithographer, Washington, D. C.

UNITED STATES PATENT OFFICE.

OBED HUSSEY, OF BALTIMORE, MARYLAND.

IMPROVEMENT IN REAPING-MACHINES.

Specification forming part of Letters Patent No. 5,227, dated August 7, 1847; Reissue No. 451, dated April 14, 1857.

DIVISION C.

*To all whom it may concern:*

Be it known that I, OBED HUSSEY, of the city of Baltimore, in the county of Baltimore and State of Maryland, have invented a new and useful Improvement in Reaping-Machines; and I do hereby declare that the following is a full, clear, and exact description of the construction and operation of the same, reference being had to the annexed drawings, making a part of this specification, in which—

Figure 1:
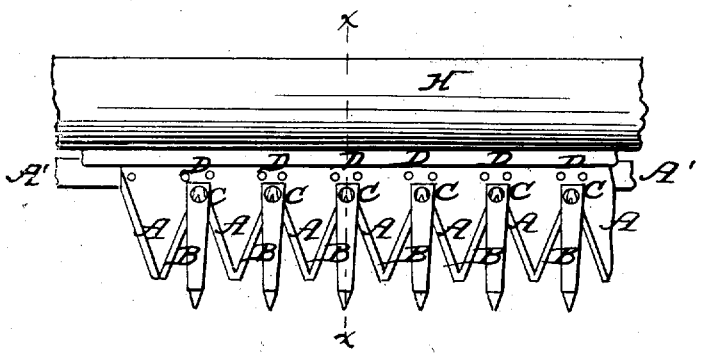

Figure 1 is a bird's-eye view of the cutting apparatus, in which A A A A A A represent angular blades, and A′ A′ the stock, of a vibrating sickle, the blades being riveted or otherwise secured to the stock, and so constructed and arranged that their cutting-edges form a zigzag or scalloped line. B B B B B B represent the permanent guard-irons. H represents a part of the wood-work. The guards are formed of a lower piece and an upper piece, admitting the blade to pass between in cutting, so that the straw, grass, hemp, corn, &c., which comes in between the guards to be cut is firmly supported both above and below the vibrating blades.

Figure 3:
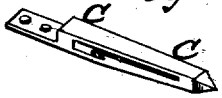

In my original invention—viz., the reaping-machine patented by me in 1833—the upper part of the guard was fastened to the lower part both before and behind the blades, as represented at C C, Fig. 3, and the grass, straw, &c., which was not perfectly cut was forced in by the shearing motion of the blades and worked back between the blades and the guards, materially obstructing the free movement of the blades, in wet weather frequently causing what the farmers call "choking."

In my improved guard-finger the lower and the upper pieces, between which the blade of the sickle plays, instead of being connected together both before and behind the blade to form a closed slot, are connected in front only, leaving the slot open behind. The shortest of these pieces, *a*, Figs. 2 and 4, extends back only just to the rear of the edge of the sickle, while the other piece, *b*, Figs. 2 and 4, extends back to the frame, to which it is connected. The space D, Figs. 1 and 2, between the short piece *a* of the finger and the back of the sickle allows straw, grass, and other matter that gets between the blade and the finger to work out, and thus prevents the sickle from clogging.

To protect the sickle still more effectually against clogging, I have made an opening, *c*, in the short part *a* of the finger, at its rear end, which occupies about three-quarters of the width of the finger. This opening extends across and a short distance both in front and rear of the line of movement, back and forth of that part of the edge of the scalloped sickle which is at and near its retreating angles or forks, thus diminishing the surface of the finger at this point, where it is very liable to clog, leaving but little space for grass and other obstructing matter to lodge upon, and making a passage by which such matter as tends to lodge on this part of the finger may work through and escape.

Figure 2:
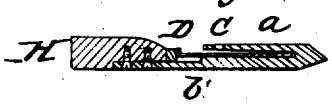
Figure 4:
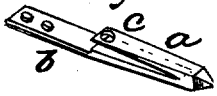

Fig. 2 represents a vertical section at the line *x x* of Fig. 1. Fig. 3 represents one of the guards of my original machine. Fig. 4 represents one of the guard-fingers containing the improvement before described.

I claim as my invention—

The combination of a slot formed between the long and short parts of the guard-finger with an opening in the rear of the short part, substantially as described.

In testimony whereof I have hereunto subscribed my name.

OBED HUSSEY.

In presence of—
WM. D. BALDWIN,
HENRY BALDWIN, Jr.